July 17, 1956

R. H. MUELLER 2,755,324

OLEFIN POLYMERIZATION PROCESS

Filed June 20, 1951

Robert H. Mueller Inventor
By Edwin M. Thomas Attorney

July 17, 1956  R. H. MUELLER  2,755,324
OLEFIN POLYMERIZATION PROCESS
Filed June 20, 1951  7 Sheets-Sheet 5

FIG.-8

United States Patent Office 2,755,324
Patented July 17, 1956

2,755,324

OLEFIN POLYMERIZATION PROCESS

Robert H. Mueller, North Plainfield, N. J., assignor to Esso Research and Engineering Company, a corporation of Delaware Application June 20, 1951, Serial No. 232,540

7 Claims. (Cl. 260—683.15)

It is the purpose of this invention to disclose a novel method for polymerizing olefins in the presence of a solid, finely divided catalyst to produce normally liquid polymers suitable for use in high octane motor fuels and for other uses. The invention particularly relates to a polymerization process in which vapor and liquid hydrocarbon phases co-exist in a reaction zone and the catalyst is maintained as an agitated suspension in the liquid phase. Liquid and vapor phases are separately withdrawn from the reaction zone, either or both of which may be recycled to the reaction zone to obtain improvements hereinafter described.

It is a primary object of the present invention to disclose a novel two-hydrocarbon phase slurry polymerization process having greater flexibility than conventional polymerization processes.

It is a further object to carry out a slurry type catalytic polymerization operation under reaction conditions such that the catalyst may be maintained in a vigorously agitated suspension in a liquid hydrocarbon phase without the need of special mixing equipment.

Another object is that of providing a polymerization process in which heat balance within the reaction zone is effectively maintained without the need of elaborate external or internal cooling means.

A further object is that of obtaining high conversions of normally gaseous olefins and maintaining the reaction zone near the optimum conversion temperature.

Additional objects include maintaining long catalyst life by suspending the catalyst in a liquid phase having a high concentration of high molecular weight polymers whereby catalyst contaminants are continually washed off of the catalyst, and at the same time providing intimate contact between the olefinic reactants and the catalyst.

Another object is to disclose a single or multistage polymerization operation in which agitation in a liquid phase is improved and the molecular weight of polymers produced is controlled by recycling either the vapor or liquid phase effluent directly from the reaction zone back to liquid phase in the reaction zone without intermediate recovery or distillation steps.

It is also an object of the invention to disclose apparatus wherein the above objects may be achieved.

The mode of achieving these and other objects of the invention will be made clear from a reading of the specification and claims taken in connection with the drawings in which:

Figure 1:
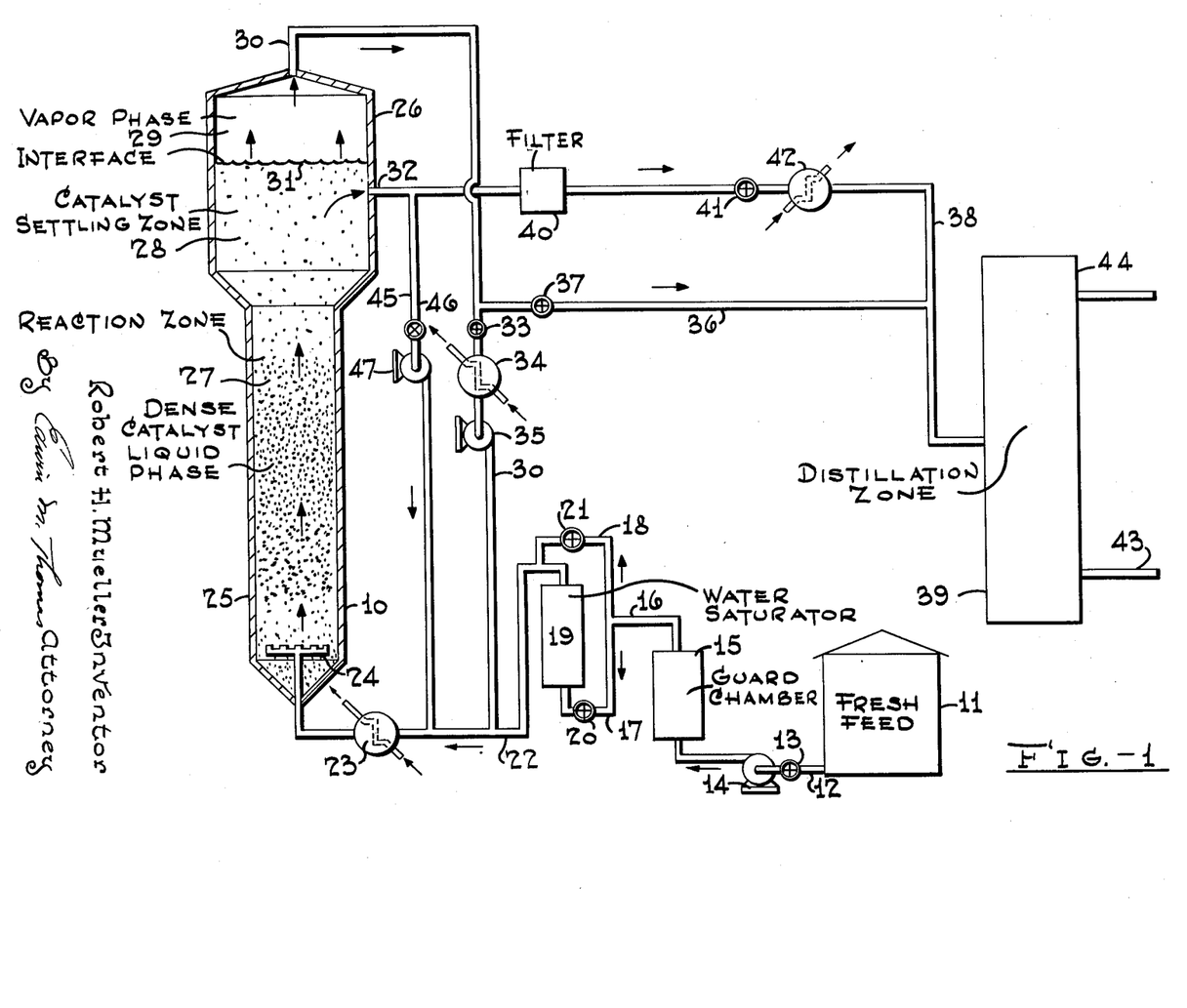
Figure 1 illustrates a reaction zone and attendant equipment, partly in vertical section, employed in carrying out the process of the present invention.

Turning now to Figure 1, the numeral 11 designates a tank containing fresh feed. For purposes of illustration, it is assumed that the fresh feed is a 50—50 mixture of $C_3$ and $C_4$ hydrocarbons containing about 50% olefins. The feed is charged through line 12 including valve 13 and pump 14 to a guard chamber 15 containing an absorbent or chemicals, such as silica gel, sodium hydroxide supported on asbestos or other materials for removing contaminating poisons from the feed. It is particularly desirable to reduce the fixed nitrogen content of the feed to below about 1.0 part per million to prevent deactivation of the catalyst. The feed is then charged through line 16 and branch line 17 including valve 20 to water saturator 19. If desired, feed may be divided into two streams, part of which passes through branch line 18, the amount being controlled by valve 21. The water saturator is usually operated at temperatures of about 100° to 130° F. in order that the hydrocarbon may dissolve the small amount of water needed to maintain the catalyst at the proper degree of hydration. An amount of water equivalent to from 0.1 to 2.0 gallons per 1000 gallons of feed is usually required for conventional solid phosphoric acid catalysts. The feed then passes through line 22 including heat exchanger 23 and into distribution means 24 in the bottom portion of the reaction chamber 10. Distribution means 24 may comprise a pipe spider, for example.

The reaction chamber 10 includes a lower portion 25 having a rather high length to diameter ratio and an upper portion 26 having cross sectional area somewhat larger than that of portion 25. Catalyst particles, which comprise about 80% phosphoric acid deposited on kieselguhr and have a size in the range of about 40 to 60 mesh, are suspended in a polymer-rich liquid hydrocarbon phase in chamber 10. The liquid phase comprises two more or less distinct portions. A lower portion 27, the dense catalyst liquid phase, has a relatively high concentration of catalyst. The upper portion 28, the disperse catalyst liquid phase, is a catalyst settling zone having a relatively low concentration of catalyst particles. Polymer-lean vapor phase 29 superimposed over the liquid phase is separated therefrom by interface 31 and is substantially free of catalyst particles.

Vapor effluent is withdrawn from the vapor phase through line 30. Liquid effluent is withdrawn from the disperse catalyst liquid phase at a point below interface 31 through line 32.

Reaction conditions in zone 10 are controlled such that the hydrocarbon contents, including normally gaseous olefins and paraffins and normally liquid polymer, are within the two phase envelope for the substantially equilibrium mixture within the zone. By controlling the reaction pressure and temperature, the rate of feed and recycled effluent introduced into the reaction zone, and the rate of vaporous and liquid effluent withdrawn therefrom, it is possible to operate in the two phase region and to maintain the interface between the overlying vapor phase and bottom liquid phase at a substantially fixed level. Once equilibrium conditions have been established within the zone, the interface is maintained at a desired level by withdrawing liquid and vaporous effluents substantially in the ratio in which they are formed.

Fresh feed introduced through distributing means 24 is at substantially reaction zone pressure and at a temperature sufficiently below reaction zone temperature such that the sensible heat of the feed up to reaction temperature will substantially balance the exothermic heat of reaction evolved in polymerization of the olefins. As the feed passes upwardly through the dense catalyst liquid phase, it will come into intimate contact with the catalyst and will be mixed with the liquid. The feed will absorb heat and the olefins will polymerize. Thus, in reaching equilibrium conditions, hydrocarbons in the pseudo liquid phase will be continually vaporized and to some extent the vapors will be absorbed by the liquid. In effect, ebullition will occur in the liquid causing vigorous agitation and some back mixing of the catalyst in the liquid. As a result of the good mixing within this phase, it is possible to maintain a fairly uniform temperature throughout the zone and to obtain intensive washing and agitation of the catalyst which improves its activity and increases its life. This may be done without mechanical agitation which is usually required in single phase, high pressure slurry operations to obtain proper mixing.

The catalyst is fluidized within the liquid phase by the velocity of both the upflowing vapors and upflowing liquid. The superficial linear velocity of the liquid (velocity when disregarding presence of catalyst and gas) will depend on the rate of liquid phase formation (or liquid effluent withdrawal rate) for a zone of given cross sectional area and will generally be much lower than the superficial vapor velocity through the liquid phase. The vapor velocity will be controlled by the rate of vapor phase formation (or the vapor effluent withdrawal rate). These combined velocities must be sufficient to keep the catalyst suspended in the liquid phase. On the other hand, the vapor velocity leaving the liquid phase preferably should not be high enough to cause appreciable foaming at the interface or to cause entrainment of appreciable amounts of liquid into the vapor phase. Likewise the combined velocity in the upper portion of the liquid phase is preferably kept sufficiently low so that catalyst particles will be disengaged from the liquid.

Since solid particles do not necessarily form dense and disperse phases separated by a rather well defined interface when fluidized in a liquid at a given velocity, it is usually best to use lower velocities in the upper portion of the liquid phase than in the lower portion to obtain substantially catalyst-free liquid effluent and substantially liquid-free vapor phase. This is conveniently done by increasing reaction zone area at the liquid effluent withdrawal point and at the liquid-vapor interface.

On the other hand, if the zone has a substantially constant cross sectional area throughout, the liquid effluent will contain appreciable concentrations of catalyst which will have to be removed by filtration, or other means before polymer product is recovered therefrom. In such cases, the removed catalyst may be returned to the liquid phase in the reaction zone if desired. Recycling of liquid effluent which contains catalyst back to the lower portion of the liquid phase will not be particularly objectionable in some cases, however.

The suspended catalyst is continuously subjected to a washing action by the liquid containing a relatively high concentration of polymers. This tends to prevent contamination of the catalyst with high molecular weight bodies and thus extends the life of the catalyst.

Contact between liquid phase and catalyst may be improved by using a packing material such as Berl saddles and the like, particularly in the dense catalyst, liquid phase portion of the reaction zone. However the combined effects of bubbling in the liquid phase during vapor formation and the upward velocities of the liquid and vapor will usually insure thorough contact in the well mixed and agitated liquid phase.

Since vapors passing through expanded zone 28 will have a somewhat lower linear velocity than those in zone 27, the catalyst particles will tend to settle back into the dense phase zone. The vapor then passes into the vapor phase 29 and is subsequently withdrawn as heretofore described. Vaporous effluent passing through line 30 containing valve 33, heat exchanger 34 and pump 35 may be combined with fresh feed in line 22 and recycled upwardly through the dense catalyst liquid phase. The temperature of the vaporous effluent may be adjusted in heat exchanger 34 if desired before it is combined with the fresh feed. If the concentration of normally gaseous hydrocarbons becomes excessive in the reaction zone when recycling all of the vaporous effluent, it may be divided and a portion passed through branch line 36 including valve 37 to line 38 and thence into distillation zone 39. In some operations it may be preferable not to recycle any of the vaporous effluent and to send all of it to recovery equipment directly.

Usually vaporous effluent will be recycled; this is done for several reasons. It may be desired to increase the velocity within zone 27, especially the vapor velocity, in order to obtain better agitation of the catalyst. The vaporous effluent is also rich in normally gaseous hydrocarbons and lean in polymers. Thus, by recycling, the effective concentration of normally gaseous materials in the catalyst zone is increased and in some cases will alter the course of polymerization.

Liquid, polymer-rich effluent withdrawn through line 32 may be passed through filtering means 40 to remove entrained catalyst and then through line 38 containing valve 41 and heat adjuster 42 to distillation zone 39. Distillation zone 39 may be of the conventional type of distillation column or columns for separating polymer and normally gaseous constituents, the former being withdrawn through line 43 and the gaseous materials through line 44. Separate recovery systems may be used for distillation of the vapor and liquid effluents, if desired.

It may be desired to recycle a portion or all of the liquid effluent which may be accomplished by passing the material through line 45, including valve 46 and pump 47, where it may be combined with the fresh feed in line 22 and passed into the reaction zone. The recycle of liquid effluent increases the concentration of polymers within the reaction zone which thus in some cases may alter the type of polymer produced and particularly tends to increase the effectiveness of the liquid phase as a medium for washing suspended catalyst. In addition, as in cases with the recycle of vaporous effluent, the linear velocity, especially the liquid velocity, through the reaction zone at a given feed rate may be increased by recycling liquid effluent.

In other instances, it may be desired to recycle both liquid and vaporous effluents to the reaction zone, either in ratio of production or in other ratios. This may be necessary to maintain fluidization and to realize effective olefin conversion and yet to produce polymers of a desired molecular weight that cannot be produced by recycling only one of the effluents. Recycle of at least a portion of the vapor phase with no recycle of liquid phase is the preferred operation, however.

Figure 2:
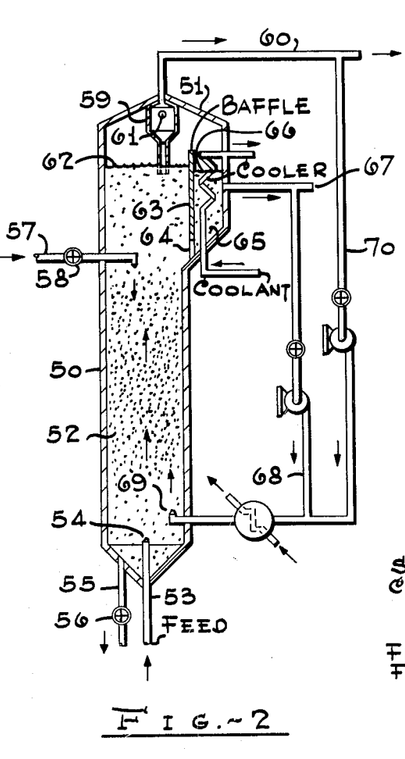
Figure 2 shows a modified reaction zone, partly in vertical section, with means provided to eliminate or minimize entrainment of catalyst in the gaseous or liquid effluents removed from the reaction zone.

Turning now to Figure 2, reaction zone 50 includes an expanded section 51 in which is maintained the interface between the liquid and vaporous phases. Fresh feed is injected upwardly through the dense catalyst, liquid-phase zone 52 by means of line 53 containing nozzle 54 or other injection means. Line 55 containing valve 56 permits continuous or intermittent withdrawal of the spent catalyst suspended in liquid hydrocarbons. Line 57 containing valve 58 permits introduction intermittently or continuously of fresh catalyst slurried in polymer or other liquid hydrocarbon into the upper portion of the dense slurry phase.

Cyclone separator 59 is disposed at the upper portion of the reaction zone and is connected to outlet 60 through which vapor effluent is withdrawn from the reaction zone. The cyclone separator includes openings such as 61 through which the vaporous material passes, and the depending leg thereof extends below interface 62. This provides a means for separating any small amounts of entrained liquid which may contain catalyst from the gas or vapor withdrawn from the reaction zone.

Baffle 63 containing opening 64 near its bottom portion, through which a portion of the bubbling liquid phase may flow, is disposed at one side of the enlarged top of the reaction zone. The baffle may suitably extend across the reaction zone such that the baffle and the walls of the reactor define a relatively quiescent zone 65 through which a cooling means such as coil 66 passes. A suitable cooling medium such as water, cool fresh feed, or the like is passed through coil 66 such that the temperature of the liquid phase in zone 65 is reduced slightly causing vapors to condense and preventing bubble formation in this zone. Usually it will not be necessary to cool more than from 1 to 5° F. below the temperature of the liquid phase in order to maintain the liquid in a non-ebullient condition. Since the liquid in zone 65 is relatively quiescent, liquid velocity through the zone being the only disturbing influence, catalyst particles settle rapidly, and substantially catalyst-free liquid effluent may be withdrawn from this zone through line 67.

All or a portion of the liquid effluent may be recycled through branch line 68 and injection nozzle 69 into the lower portion of the dense catalyst liquid phase and upwardly therethrough. On the other hand, for reasons as described previously, it may be desirable to send all of the liquid phase to a recovery system and to recycle all or a portion of the gaseous effluent through line 70 and nozzle 69 upwardly through the liquid phase in the reaction zone. Mixtures of both liquid and vaporous effluent may be recycled as described previously.

Figure 3:
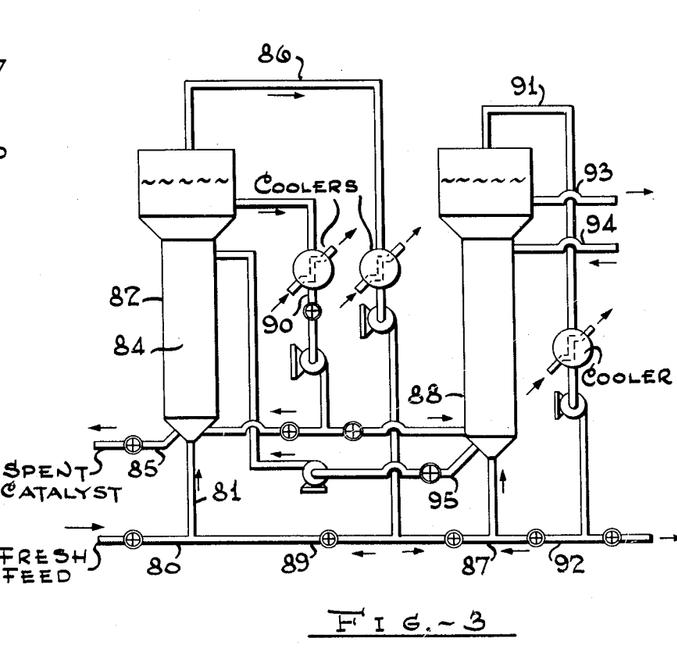
Figure 3 illustrates an operation in which two reaction zones are employed in series with countercurrent flow of catalyst, and with recycle of effluents.

Figure 3 illustrates a mode of carrying out a multi-stage operation in which there is countercurrent flow of catalyst and reactants. Fresh feed is introduced through line 80 and branch line 81 into the bottom of reactor 82 and passes upwardly through dense catalyst liquid phase 84 in a manner previously described. A slurry of liquid and spent catalyst is withdrawn through line 85 from the bottom portion of the dense catalyst phase either continuously or intermittently. Vaporous effluent is withdrawn through line 86 and may be passed through branch line 87 to the bottom portion of reaction zone 88, or recycled to zone 82 through branch line 89, or it may be divided, portions of it passing to both zones 82 and 88.

Liquid effluent is withdrawn from zone 82 through line 90 and is pumped into the bottom portion of zone 88. If desired, this stream may be recycled to zone 82 or divided and portions sent to both zones 82 and 88. Vaporous effluent is withdrawn from zone 88 through line 91, a portion of it being recycled through branch line 92 back into zone 88 and the remainder sent to a recovery system not shown. Liquid effluent is withdrawn through line 93 and is sent to recovery equipment not shown. If desired, a portion of this liquid effluent may be recycled back to zone 88 in a manner described in connection with Figure 1. A slurry of fresh catalyst in liquid hydrocarbon, such as polymer produced in the reaction zone or other suitable carrying medium, is charged into the upper portion of the dense phase in zone 88 through line 94. A portion of the dense catalyst, liquid phase is withdrawn either continuously or intermittently from the bottom of zone 88 through line 95 and is pumped into the upper portion of the dense catalyst liquid phase in reaction zone 82. This countercurrent flow of feed and catalyst permits greater effective life of the catalyst than is obtained either in concurrent flow or in single stage operations.

It is realized, of course, that 2, 3, 4, or more reaction zones may be connected in series and operated in the manner as described in connection with Figure 3, the multi-stage operation giving higher overall olefin conversions per unit of catalyst than is obtained in single stage operation. In some cases it may be desired to recycle all of the gaseous effluent back to the zone from which it was withdrawn, to charge the liquid phase effluent to a following adjacent zone, and to recover only liquid phase from the last zone. In another modification the vaporous effluent withdrawn from the first of two adjacent zones may be divided, part of it going to the zone from which it was withdrawn and the other part going to the immediately following adjacent zone, and all of the vaporous effluent from the last zone being recycled to the last zone.

It is obvious from the above disclosure that a number of modifications may be employed, each of which has its particular advantage when using a single stage or a multi-stage operation. By withdrawing both a vaporous hydrocarbon phase and a liquid hydrocarbon phase from the reaction zone, considerable flexibility is offered in carrying out the operation such that the catalyst may be slurried and agitated in the desired manner and such that a desired olefin conversion is achieved.

It is preferred that the olefins used in the practice of the present invention comprise the $C_2$, $C_3$, $C_4$ and $C_5$ olefins and their admixtures. The feed usually should contain from 30 to 90% or even 100% olefins, the remainder being paraffinic diluents. Since ethylene is rather difficult to polymerize under the conditions needed to provide two phases in the reaction zone, the feed will preferably contain only minor portions of this olefin based on the total olefin content. The $C_3$ and $C_4$ olefins and their mixtures are the preferred feed stocks.

The feed and the reaction mixture should as a rule be substantially free of inert gases, such as nitrogen, hydrogen and the like and methane since such gases will change the phase relationships between the feed and polymer and make two phase operation difficult and even impossible under some conditions.

It may be desired in some cases to maintain a relatively high boiling hydrocarbon diluent in the reaction zone. Such a diluent will decrease the pressure at which two phase conditions are maintained for a given percent of vapor phase in equilibrium with liquid phase. The liquid diluent also aids in washing the catalyst suspended in the liquid phase. The liquid diluent preferably should be non-olefinic in character and may boil in the gasoline, kerosene, or even light gas oil range. It may be introduced with the feed or as a carrier for fresh catalyst.

The fresh feed is preferably charged to the reaction zone at substantially the same pressure that exists within the reaction zone. The temperature of the fresh feed will be below the reaction zone temperature such that the sensible heat of the feed up to the desired reaction temperature will aid in balancing the exothermic heat of reaction evolved in the polymerization operation. Thus, the fresh feed temperature will depend on such factors as olefin content, conversion level and reaction temperature to obtain the desired heat balance. Since both the liquid effluent and the vaporous effluent are at substantially equilibrium temperature and pressure when withdrawn, they may be recycled without heating or cooling. However, some heating or cooling of these streams may be in order to achieve proper heat balance control under some conditions. In multi-stage operations, the liquid and/or vapor effluents passed from one zone to an adjacent zone will usually require interstage cooling to a sufficiently low temperature so that the sensible heat up to reaction temperature will balance heat evolved in the adjacent zone.

The catalyst used in the present invention must be one that will have polymerization activity under temperature conditions required to maintain two phases in the reaction zone. Phosphoric acid deposited on a siliceous material such as diatomaceous earth, kieselguhr, silica gel, alumina silicates, and/or adsorbent carbon and the like is usually preferred. The phosphoric acid content of the catalyst will generally be in the range of 50 to 90% by weight based on the total catalyst. Other catalysts such as zirconia, thoria, dehydrated activated alumina copper-pyrophosphate and other such solids, finely divided catalysts may be used preferably supported on silica, activated carbon and the like.

Since solid phosphoric acid catalyst of the small particle size used may agglomerate when subjected to severe polymerization conditions, probably due to the absorption of heavy polymers, it is desirable to provide means for preventing this difficulty. One method is that of co-suspending with the finely-divided catalyst a solid diluent which preferably is substantially chemically inert with respect to polymerization activity, which has some surface absorption capacity, and which has about the same size and fluidizing, and settling characteristics as the catalyst. Such solid diluents include silica, alumina, activated carbon, silica or carbon containing small amounts of impregnated phosphoric acid (in the range of 5–50% by weight of phosphoric acid) and the like.

The particle size of the fresh solid catalyst and diluent may vary from about 20 mesh up to 200 mesh. The solid should not be fine enough to channel or to entrain from the liquid phase in appreciable amounts. For this reason it is not desired to have substantial quantities of catalyst above 200 mesh in the fresh catalyst. Some attrition of the catlyst will take place during the polymerization reaction, and particles in the range of 200 to 300 mesh and even finer will be formed; however, the formation of such fines will not be serious as long as the content is not too great. It is generally preferable to use a relatively small range of sizes such as particles in the range from 20 to 40 mesh, 40 to 60 mesh, 100 to 150 mesh and the like when starting with a fresh catalyst. The content of catalyst fines or solid diluent fines in the reaction zone may be controlled by withdrawal of catalyst from time to time and adding fresh make-up catalyst as needed.

The catalyst density in the liquid phase will depend to some extent on the fluidizing velocity used to keep the catalyst in suspension, the catalyst particle size, and other operating conditions. When employing a catalyst having a density in the order of 60 lbs. per cu. ft., the catalyst density in the liquid phase will usually be below about 45 lbs. per cu. ft. and usually not less than 15 lbs. per cu. ft.

The superficial vapor velocity in the liquid phase should be controlled within well defined limits in order to keep the catalyst particles slurried and in continuous agitation. The vapor velocities will generally be somewhat lower than those used in gaseous phase fluidized catalytic operations to minimize entrainment of liquid phase which may contain catalyst into the vaporous phase. The velocity generally should be less than about 30 to 50 feet per minute with a preferred range of from 1 to 20 feet per minute. By constructing the reaction zone such that the dense catalyst liquid phase has a somewhat smaller cross sectional area than the vaporous phase, it is possible to employ relatively high fluidizing velocities in the liquid phase, the velocities falling to much lower figures in the vapor phase thus minimizing entrainment of the liquid phase.

The superficial liquid velocity through the liquid phase should be about 0.5 to 2.0 feet/minute or even higher to keep the catalyst well dispersed and to increase turbulence in the liquid phase.

As mentioned heretofore, the velocity through the reaction zone is controlled not only by the rate of injection of fresh feed but also by recycling of liquid and vaporous effluent. The ratio of liquid or vaporous effluent recycled to the fresh feed injected may be varied widely depending on the dimensions of the reaction zone, on the size of the catalyst, on the conversion to be obtained and other factors.

It is generally desirable to obtain olefin conversions in the range of 50 to about 95% or higher. As a rule, feed rates of from 0.2 to 2.5 gallons of feed per hour per lb. of catalyst will be employed to obtain such conversions, relatively low feed rates being preferred for high conversions. In multi-stage operations, the feed rate may be varied to give somewhat smaller conversions in the first zone, conversion of most of the remaining olefins taking place in the subsequent zones.

An extremely important aspect of the present invention is that of defining temperature and pressure to be maintained in the reaction zone in order to achieve two phase operation. In addition the temperature and pressure must be such that appreciable polymerization of olefins will take place with the catalyst employed. Phase equilibrium data are readily determined experimentally by known means at various temperatures and pressures in order to obtain the phase envelope for a particular mixture of normally gaseous and normally liquid hydrocarbons, the phase envelope being a useful tool for determining what conditions to set in the reaction zone at a given olefin conversion.

Figure 4:
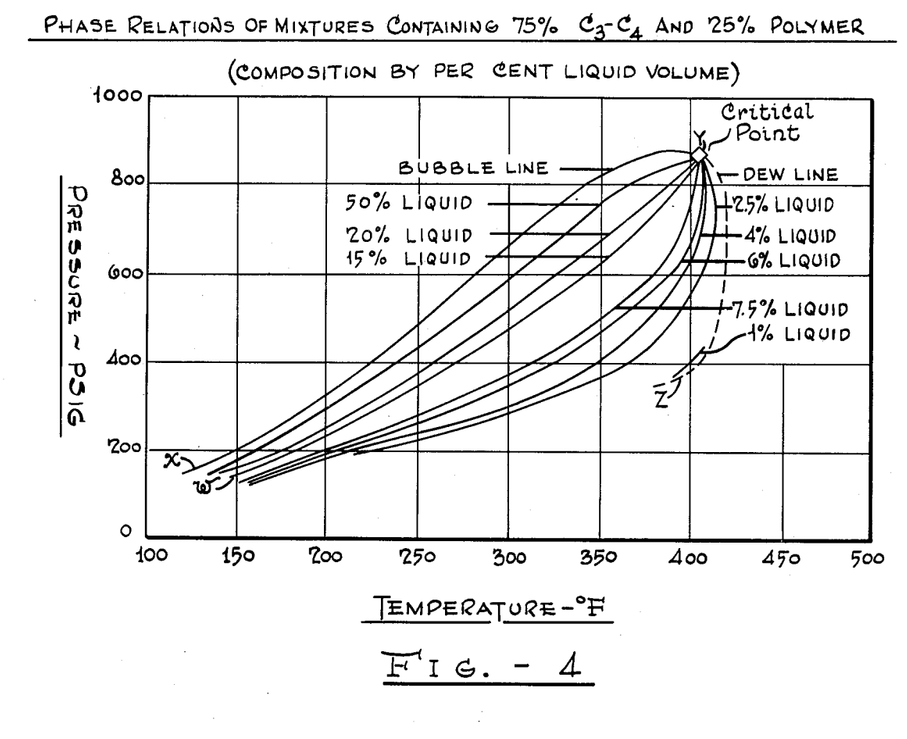
Figures 4 through 8 present phase envelopes for olefin-paraffin-polymer mixtures which define regions of operation with two hydrocarbon phases.

Figure 4 shows a typical phase envelope for a mixture of 75% $C_3$ and $C_4$ hydrocarbons and 25% polymer produced by polymerizing $C_3$ and $C_4$ olefins in the presence of a solid phosphoric acid catalyst. The phase envelope was determined experimentally for this mixture and shows clearly how the two phase region lies within the envelope defined by bubble line XY and dew line YZ. Y is the locus of the equilibrium condensation pressure which occurs at about 850 p. s. i. g. and 405° F. for this particular mixture. The lines such as WY within the envelope give the percent liquid phase and percent vapor phase in equilibrium with one another at a given pressure and temperature. It will be noted that only one phase can exist outside of the bubble line and the dew line, the bubble line curve representing zero percent vapor and the dew point curve representing 100% vapor. At about 1000 p. s. i. g., the mixture is in a single fluid phase and changes from dense gas to liquid without discontinuity.

Figure 5:
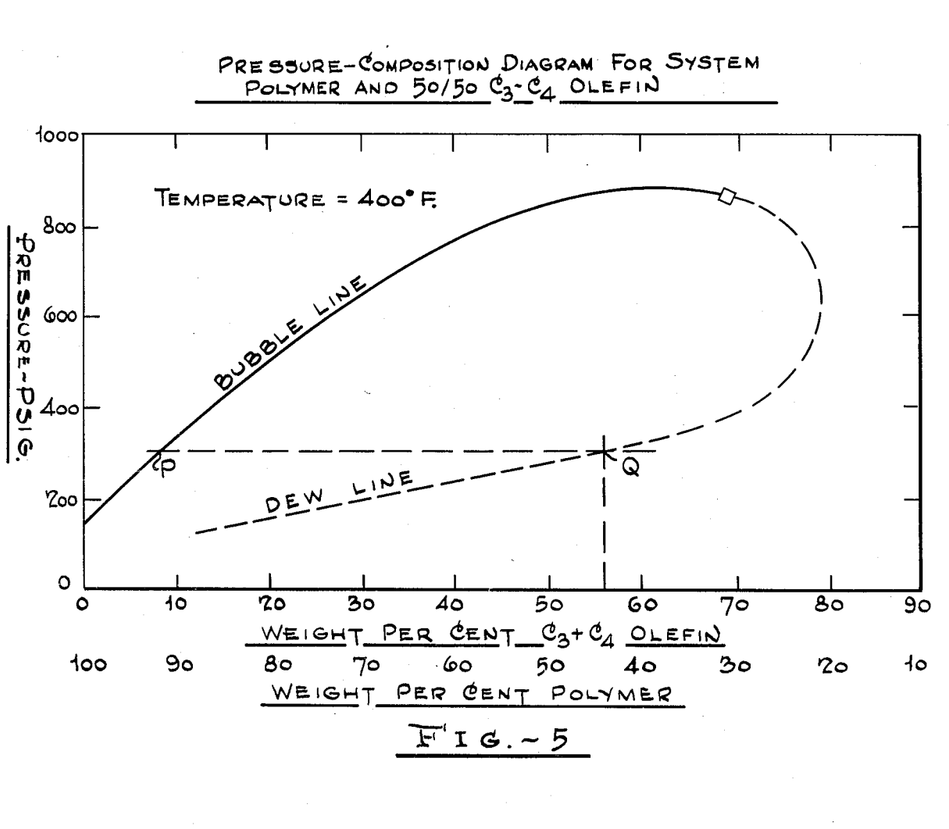

Figure 5 presents the isotherm at an operating temperature of 400° F. for the system, $C_8$ polymer and 50–50 mixture of $C_3$—$C_4$ olefin. A horizontal tie line such as PQ gives the composition and proportion by weight of the coexistent phases. At temperatures above 400° F. the envelope will be compressed toward the left. In this pressure-composition plot, the course of isothermal polymerization will be represented approximately by a line such as PQ followed from right to left at the required pressure level. At 300 p. s. i. g., the mixture will be completely in the vapor phase if the polymer content is less than about 40% but will be as two co-existent phases at higher polymer contents. For an isotherm at 450° F. and the same pressure, the limiting polymer content will be raised to about 50%.

Figure 6:
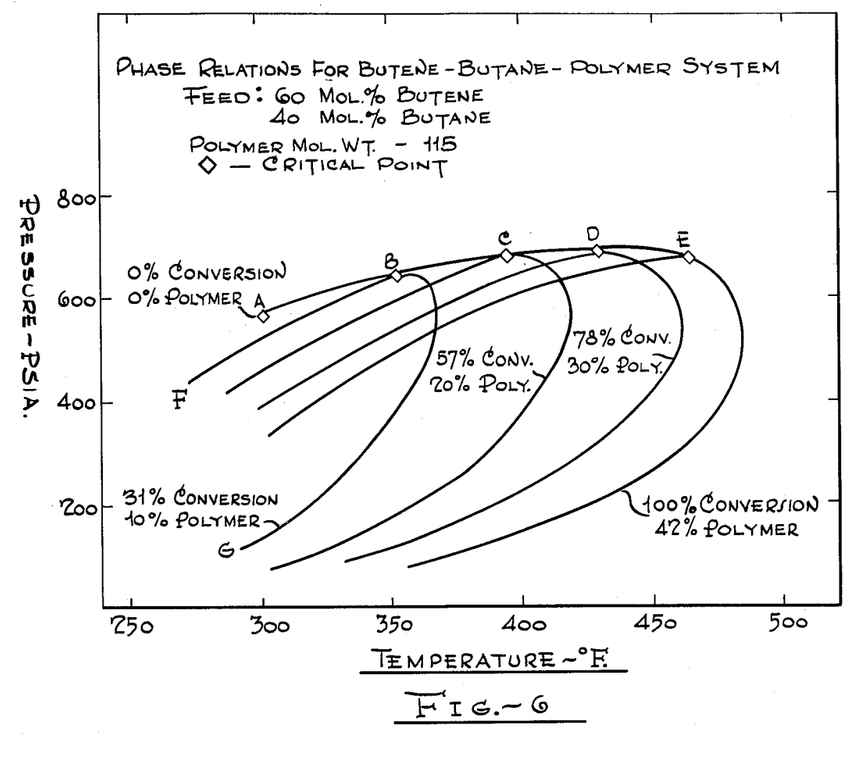

Figure 6 presents a series of phase envelopes for a $C_4$-polymer system when polymerizing a mixture of 60 mol per cent butene and 40 mol per cent butane at various conversion levels to produce polymers having an average molecular weight of about 115 which were calculated by known means. The line ABCDE represents loci of critical condensation pressures for $C_4$-polymer systems having progressively increasing polymer contents. Phase envelopes such as FBG give a two phase region for a specific system obtained at a given conversion level. It is readily seen that progressively higher temperatures are needed to maintain two-phase conditions as the polymer contents resulting from higher conversions are increased. By employing a system of phase envelopes of this type, one may select a conversion level that will be desired, select a pressure and temperature that must be maintained within the reaction zone to stay within the phase envelope, and carry out the reaction at appropriate contact times to achieve the conversion desired.

Figure 7:
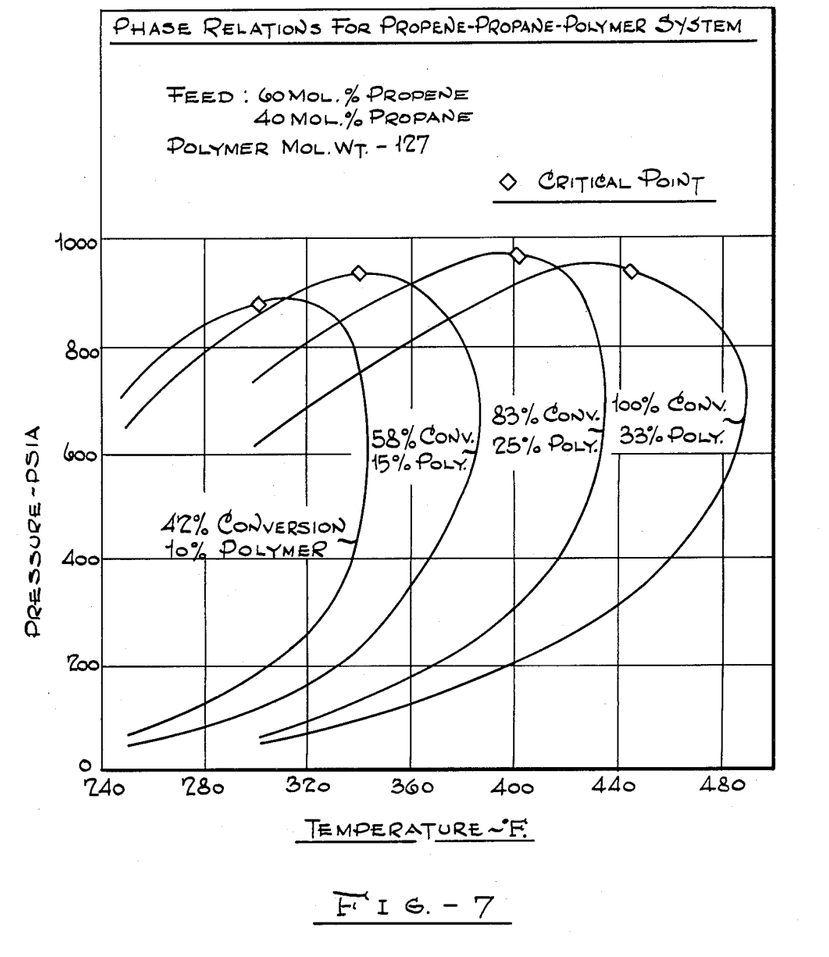

Figure 7 likewise shows a series of calculated phase envelopes for the system, $C_3$-polymer when subjecting a feed comprising 60 mol per cent propene and 40 mol per cent propane to polymerization at various conversion levels to produce a polymer having an average molecular weight of about 127. This series of envelopes may be used as a useful guide to operating conditions in the same manner as those shown in Figure 6.

Figure 8:
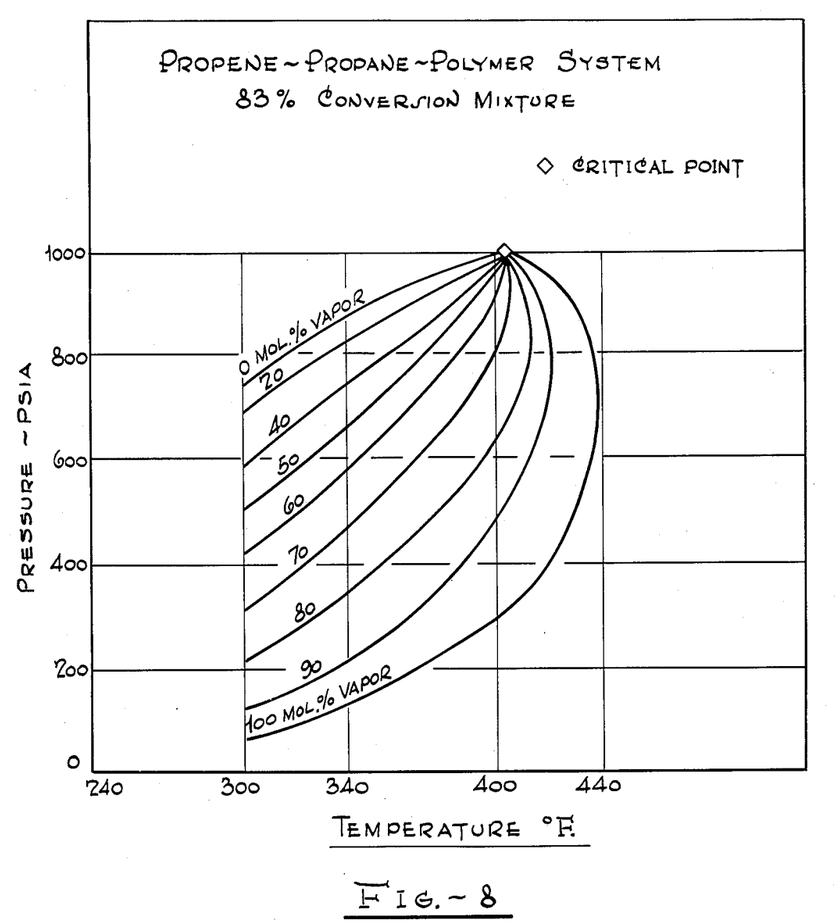

Figure 8 shows the envelope when employing the propene-propane mixture described in connection with Figure 7 at a conversion level of 83%. In this particular system, which contains 25 mol per cent polymer, lines within the envelope are shown connecting with the critical point; these lines represent the mol per cent vapor existing in equilibrium with liquid in the two phase region at a temperature above 300° F. and at any pressure up to about 1000 lbs. per sq. in. absolute. A phase envelope of this type is extremely useful in determining the relative proportions of liquid and vapor phases existing under given conditions and at a given conversion and serves as a guide in determining the relative rates at which liquid effluent and vapor effluent will have to be withdrawn from the reaction zone to maintain the liquid-vapor interface at a fixed level.

The phase envelopes presented in Figures 6, 7 and 8 are calculated from the best available constants and should be considered as approximate. They will serve, however, as useful guides in selecting approximate operating conditions. An infinite number of possible phase equilibria exist for systems involving normally gaseous olefins and paraffins and the polymers resulting from the olefins. Therefore, experimental means should usually be resorted to in defining precise two-phase equilibria conditions of temperature and pressure for any particular system.

One convenient experimental method, used in obtaining the data presented in Figure 4, involves a study of phase behavior in a Jerguson gauge glass. The gauge glass is placed in a suitable heating medium, desired amounts of olefin, paraffin and polymer are charged to the glass in order of increasing volatility, and the system is pressurized. The temperature is then adjusted to a desired level. The pressure is raised to 100–200 p. s. i. g. above the bubble point at which a single phase exists, and is then slowly lowered to below the bubble point. The volumes of liquid and vapor existing at a given temperature and pressure may then be determined, and if desired each of the phases may be analyzed to determine the relative contents of normally gaseous and normally liquid materials present.

In general, at a given content of polymer (boiling in the gasoline boiling range) in equilibrium with the various normally gaseous olefins, the two phase region occurs in about the same temperature range. Pressure ranges, however, will vary rather widely depending on the type of olefin feed used. Systems including ethylene will have a two phase region at pressures above about 1000 p. s. i. g., while those including $C_5$ olefins will have phase envelopes occurring at somewhat lower pressures than those for the $C_4$ olefins.

In general, temperatures above about 300° F. will be required in the reaction zone to obtain commercially feasible conversions of the olefin with conventional solid polymerization catalysts. On the other hand temperatures should be below about 500° F. to maintain the hydrocarbon contents of the reaction zone in the two phase region. Pressures in the range of about 200 to 1000 p. s. i. g. are also required to keep the mixture in the two phase region, the high pressures being used for the lighter, normally gaseous olefins and the lower pressure being used for the heavier, normally gaseous olefins.

When employing $C_3$ and $C_4$ olefins or mixtures of these in the feed, temperatures should range from about 300 to 475° F. and pressures from about 250 to 850 lbs. p. s. i. g. with preferred ranges being 400 to 450° F. and 400 to 650 p. s. i. g. to achieve optimum olefin conversions and to obtain suitable control of the operation.

In general it is preferred not to operate at pressures and temperatures that will give a two phase region close to the dew line or bubble line or the critical point of the particular equilibrium mixture in the reaction zone. Operating conditions close to these lines are such that small deviations in temperatures or pressures may throw the operation out of the two phase into the single phase region, and control of the operation will then be impossible. It is preferred as a general rule that the equilibrium mixture in the reaction zone contain in the range of about 20 to 90 mol per cent vapor phase and that the operation be carried out at least about 50 to 75 lbs. below the critical point. Recycle of vapor and/or liquid effluent will alter phase relationships in the reaction zone which may require some changing of pressure and temperature as compared to once through operation.

The following examples will illustrate more clearly how specific operations may be conducted in the practice of the present invention.

EXAMPLE 1

In an operation with phosphoric acid-silica gel catalyst (containing about 80% phosphoric acid), a $C_3$ feed containing 60 mol per cent propylene is passed upwardly through a dense catalyst liquid phase under conditions such that a two phase system exists in the reaction zone and at a feed rate such that an 83% conversion of olefins is achieved in a single stage. The effect of temperatures and pressures on the percentages of vapor and liquid phases in the reaction zone and on the composition of the liquid phase (calculated from Figures 7 and 8) is shown in Table I below:

*Table I*

POLYMERIZATION OF 60 MOL PERCENT $C_3^=$–40 MOL PER CENT $C_3$ FEED AT 83% CONVERSION LEVEL UNDER TWO PHASE CONDITIONS

| Run No. | Temp., °F. | Pressure, p. s. i. a. | Vapor Phase Mol Percent | $C_3^=$ in Liquid Phase, Mol Percent | Polymer in Liquid Phase, Mol Percent |
|---|---|---|---|---|---|
| A | 400 | 320 | 98.5 | 4.2 | 77.4 |
| B | 435 | 700 | 98.5 | 8.6 | 56.9 |
| C | 400 | 670 | 80.5 | 9.4 | 51.6 |
| D | 400 | 920 | 60.0 | 13.1 | 33.9 |

It is noted that in runs A and B, the system is operable but usually not feasible since the equilibrium mixture is near the dew line of the phase envelope. The pressure in run D is fairly close to the critical point. Slight variations in temperature or pressure in the reaction zone could give single phase operation very easily in these runs. In run C, the vapor phase contains about 19 mol per cent polymer, 65% propane and 16 mol per ment propylene; the liquid phase contains 52 mol per cent polymer, 39 mol per cent propane and 9 mol per cent propylene. If the system is operated in a single phase to achieve the same conversion, the hydrocarbon phase would comprise 25 mol per cent polymer, 60 mol per cent propene and 15 mol per cent propylene. It is thus seen that the liquid phase in the two phase operation will contain an appreciably higher concentration of polymer than the single phase operation, while the vapor phase will contain a correspondingly lower concentration of polymer.

EXAMPLE 2

Run C of Example 1 is carried out in a reaction vessel having a length to diameter ratio in the dense catalyst liquid phase proportion of about 5/1, the diameter at this point being approximately 5 ft. A feed rate of about 0.25 gallon per hour per lb. of catalyst is employed and the catalyst density in the liquid phase is maintained at about 25 lbs. per cu. ft. When operating at a feed rate of 5590 barrels per day to produce 1975 barrels per day of polymer, the superficial linear vapor velocity through the catalyst bed is about 3.25 ft. per minute with no recycle. Table II below shows comparative vapor velocities when recycling various amounts of vapor phase to the lower part of the 5 feet diameter reaction zone when the upper zone including both the disperse catalyst liquid phase and the vapor phase has a diameter of 5 feet and of 10 feet:

Table II

| Ratio of Vapor Phase Recycled to Fresh Feed | 0 | 3 | 8 | 20 |
|---|---|---|---|---|
| Velocity, Feet/Minute: | | | | |
| Entering Liquid Phase (5' Dia. Zone) | 3.25 | 11.3 | 25.1 | 58 |
| Leaving Liquid Phase (5' Dia. Zone) | 1.79 | 9.9 | 23.7 | 56.5 |
| Leaving Liquid Phase (10' Dia. Zone) | 0.45 | 2.5 | 5.9 | 14.1 |

When employing a reactor of the size used in this example, it is noted that the vapor velocity exceeds about 30 ft. per minute when the ratio of vapor phase recycled to fresh feed is about 10:1 to 15:1 for a 5 feet diameter catalyst settling zone. Vapor velocities in the league of about 57 ft. per minute are obtained with the same sized settling zone when recycling as much as 20 volumes of vapor phase per volume of fresh feed which, under most operating conditions, may be excessive when employing a two phase system because of entrainment difficulties, high catalyst losses and the like. By employing a disperse catalyst liquid phase zone having four times the cross sectional area of the dense phase zone, velocities leaving the liquid phase are reduced appreciably. This permits using high velocities in the dense phase to obtain efficient agitation of catalyst. Since the liquid phase velocity through the 5' zone is only about 0.4 foot/minute, it may be necessary to recycle sufficient liquid effluent to increase the velocity to at least 0.7 or more foot/minute.

EXAMPLE 3

A run is carried out in which a feed containing 60 mol per cent butylene and 40 mol per cent butane is reacted at 600 p. s. i. g. and 450° F. in the presence of finely divided solid phosphoric acid catalyst at two phase conditions. When operating at a 95% conversion level using about 0.5 gallon of feed per hour per lb. of catalyst, about 63 mol per cent of vapor phase is obtained containing about 62 mol per cent butane, 10 mol per cent butene and 28 mol per cent polymer. About 37 mol per cent liquid phase is obtained containing 41 mol per cent butane, 7 mol per cent butene and 52 mol per cent polymer. When operating under conditions in a single phase operation such that the same conversion is obtained, the product has 54.8 mol per cent butane, 8.2 mol per cent butene, and 37 mol per cent polymer.

The terms "polymer-rich liquid phase" and "polymer-lean vapor phase" are used herein as relative terms, the liquid phase containing a higher mol per cent polymer than the vapor phase. Obviously, either phase may under certain conditions contain major or minor amounts of polymer depending on conversion, phase relationships, and the like. The term "liquid phase" refers to the phase comprising major portions of liquid hydrocarbons although of course, it also includes suspended catalyst particles and bubbles of vaporous hydrocarbons that are formed continuously and pass into the overlying vapor phase.

What is claimed is:

1. A continuous process for polymerizing $C_3$—$C_4$ gaseous olefins which comprises maintaining a polymerization zone at a temperature and pressure within the two-phase region for the hydrocarbon contents thereof whereby a polymer-rich liquid hydrocarbon phase and a polymer-lean vapor hydrocarbon phase coexist in equilibrium, said zone including an upper expanded portion having a greater cross sectional area than the lower portion thereof whereby said vapor phase and an upper portion of said liquid-phase reside in said upper expanded portion, maintaining a finely divided solid phosphoric acid polymerization catalyst suspended in said liquid phase, feeding said olefins into the lower portion of said zone and upwardly through said liquid phase at a rate whereby said catalyst remains as a relatively dense agitated suspension in the lower liquid phase and settles from the upper liquid phase and whereby the desired conversion of olefins to polymer occurs, withdrawing a vapor effluent from said vapor phase and withdrawing a liquid effluent from said upper liquid phase, said effluents being withdrawn in substantially the ratio at which vapor and liquid phases are formed in said zones, said temperature being in the range of about 300° to 475° F., and said pressure being in the range of about 250 to 850 p. s. i. g.

2. A process in accordance with claim 1 in which at least a portion of said upper liquid phase is cooled sufficiently to maintain it in a relatively quiescent state and said liquid effluent is withdrawn from said quiescent portion.

3. A continuous process for polymerizing normally gaseous olefins which comprises maintaining a plurality of polymerization zones each of which contains a polymer-rich liquid hydrocarbon phase, a polymer-lean vapor hydrocarbon phase and a finely divided solid polymerization catalyst suspended in the liquid phase, withdrawing separately vapor effluent and liquid effluent from the vapor and liquid phases, respectively, of each zone, feeding said olefins upwardly through said liquid phase in the first of said plurality of zones at a rate whereby said catalyst remains suspended in said liquid phase and the desired conversion of olefins to polymer occurs, and passing at least a portion of the vapor effluent from the first of any two adjacent zones upwardly through the liquid phase of the second of said adjacent zones, the reaction conditions in each of said zones being maintained within the two-phase envelope for the hydrocarbon contents thereof whereby said liquid and vapor phases coexist.

4. A process in accordance with claim 3 in which at least a portion of the vapor effluent withdrawn from any one of said zones is passed upwardly through the liquid phase of that zone.

5. A process in accordance with claim 3 in which at least a portion of the liquid effluent withdrawn from the first of said adjacent zones is passed upwardly through the liquid phase of the second of said adjacent zones.

6. A process in accordance with claim 3 in which at least a portion of the liquid effluent withdrawn from any one of said zones is passed upwardly through the liquid phase of that zone.

7. A process in accordance with claim 3 in which fresh catalyst is added to the liquid phase of the last zone, liquid phase including suspended catalyst is passed from the second of said adjacent zones to the liquid phase of the first of said adjacent zones, and liquid phase including suspended spent catalyst is withdrawn from the first zone.

References Cited in the file of this patent

UNITED STATES PATENTS

| 2,291,216 | Gerhold | July 28, 1942 |
| 2,380,234 | Hall | July 10, 1945 |
| 2,438,029 | Atwell | Mar. 16, 1948 |
| 2,470,904 | Shanley | May 24, 1949 |
| 2,474,583 | Lewis | June 28, 1949 |
| 2,486,533 | Mayland et al. | Nov. 1, 1949 |
| 2,559,576 | Johnstone | July 3, 1951 |
| 2,626,289 | Russell | Jan. 20, 1953 |
| 2,626,290 | Fell et al. | Jan. 20, 1953 |
| 2,626,291 | Betts | Jan. 20, 1953 |
| 2,626,292 | Gornowski | Jan. 20, 1953 |
| 2,626,293 | Sweetser | Jan. 20, 1953 |